United States Patent [19]

Stingelin

[11] Patent Number: 5,143,519
[45] Date of Patent: Sep. 1, 1992

[54] CONCENTRATED ACID DYE SOLUTIONS: STORAGE STABLE AQUEOUS DYE CONCENTRATE WITH DI-ETHYL-AMINO-PROPYLAMINE

[75] Inventor: Willy Stingelin, Reinach, Switzerland

[73] Assignee: Ciba-Geigy Corporation, Ardsley, N.Y.

[21] Appl. No.: 677,721

[22] Filed: Mar. 29, 1991

[30] Foreign Application Priority Data

Apr. 3, 1990 [CH] Switzerland ............... 1102/90

[51] Int. Cl.$^5$ ............... C09B 67/00; C09B 29/03; C09B 67/36
[52] U.S. Cl. ............... 8/527; 8/564; 8/585; 8/602; 8/604; 8/611; 8/684; 8/689; 8/690; 8/691; 8/918; 8/919
[58] Field of Search ............... 8/527, 602, 604, 684

[56] References Cited

U.S. PATENT DOCUMENTS

3,862,116 1/1975 Toji ............... 534/775
4,995,885 2/1991 Morawietz ............... 8/527

FOREIGN PATENT DOCUMENTS

1333023 10/1973 United Kingdom .

*Primary Examiner*—A. Lionel Clingman
*Attorney, Agent, or Firm*—Marla J. Mathias; Edward McC. Roberts

[57] ABSTRACT

Concentrated dye solutions of dyes of the formula (1) shown in claim are described.

The dye solutions are distinguished by a good storage stability and are suitable, in particular, for dyeing paper.

15 Claims, No Drawings

CONCENTRATED ACID DYE SOLUTIONS: STORAGE STABLE AQUEOUS DYE CONCENTRATE WITH DI-ETHYL-AMINO-PROPYLAMINE

The present invention relates to concentrated aqueous dye solutions, comprising
a) 7 to 30% by weight of a dye of the formula

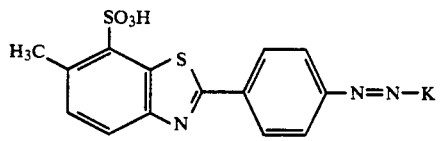

in which K is a coupling component of the acetoacetanilide, pyridone, pyrazolone or pyrimidine series,
b) at least 0.1 but less than 1 mol of 3-diethylamino-1-propylamine, per mol of dye of the formula (1),
c) a quantity of a hydroxyalkylamine such that altogether 1.5 to 5 mol of the components b) and c) are present per mol of dye, and
d) if desired, other additives.

Preferred dye solutions according to the invention contain 0.1 to 0.9, in particular 0.2 to 0.6 mol, of 3-diethylamino-1-propylamine per mol of dye of the formula (1) and 2 to 4, in particular 2.5 to 4 mol, of hydroxyalkylamine.

The dye solutions according to the invention preferably comprise 10 to 25% by weight of a dye of the formula (1).

In the above formula (1), K is a coupling component of the acetoacetanilide, pyridone, pyrazolone or pyrimidine series. It is, in particular, the coupling components customary in azo dyes, in particular in paper dyes.

K is preferably a coupling component of the formula

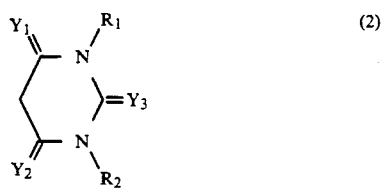

in which $Y_1$ and $Y_2$ independently of one another are $=O$, $=NH$ or $=N-C_1-C_4$alkyl, $Y_3$ is $=O$, $=S$, $=NR$ or $=N-CN$, where R is hydrogen or $C_1-C_4$alkyl, and $R_1$ and $R_2$ independently of one another are each hydrogen, substituted or unsubstituted alkyl or substituted or unsubstituted phenyl.

In the above formula (2), only one tautomeric form is indicated for the coupling component, the other tautomeric forms, however, are also intended to be included by this formula.

A substituted or unsubstituted alkyl group $R_1$ and/or $R_2$ is, for example, a methyl, ethyl, n-or iso-propyl, n-, sec- or tert-butyl radical, a straight-chain or branched pentyl or hexyl radical or a cyclohexyl radical, which can be monosubstituted or polysubstituted, for example, by —OH, $C_1-C_4$alkoxy or $C_1-C_4$hydroxyalkoxy.

Examples of suitable substituted alkyl radicals are: methoxymethyl, ethoxymethyl, ethoxyethyl, ethoxypropyl, n-propoxymethyl, isopropoxymethyl, butoxymethyl, butoxyethyl, butoxypropyl, methoxybutyl, ethoxypentyl and 2-hydroxyethoxypentyl.

Substituted or unsubstituted phenyl radicals $R_1$ and/or $R_2$ are phenyl radicals which are unsubstituted or monosubstituted or polysubstituted by identical or different radicals.

Examples of suitable radicals of this type are: $C_1-C_4$alkyl, which in this application is generally to be understood as meaning methyl, ethyl, n- or iso-propyl or n-, sec- or tert-butyl, $C_1-C_4$alkoxy, which in this application or generally includes methoxy, ethoxy, n-or iso-propoxy or n-, sec- or tert-butoxy, halogen such as fluorine, chlorine or bromine, or nitro.

Preferably, $R_1$ and/or $R_2$ as phenyl are phenyl which is unsubstituted or substituted by 1 to 3 $C_1-C_4$alkyl, chlorine or methoxy groups, the meaning unsubstituted phenyl being particularly preferred.

$R_1$ and $R_2$ are preferably hydrogen or $C_1-C_4$alkyl and particularly preferably hydrogen or methyl.

$Y_1$ and/or $Y_2$ are preferably the functional group $=O$ or $=NH$, it additionally being preferred that $Y_1$ and $Y_2$ are identical. $Y_1$ and $Y_2$ are particularly preferably identical and are in each case $=NH$.

$Y_3$ is preferably the group $=O$, $=S$, $=NH$ or $=N-CN$ and particularly preferably the group $=NH$.

In a particularly preferred embodiment, the dye solutions according to the invention contain azo dyes of the formula (1) in which $R_1$ and $R_2$ independently of one another are each hydrogen or $C_1-C_4$alkyl, $Y_1$ and $Y_2$ independently of one another are each $=O$ or $=NH$ and $Y_3$ is $=O$, $=S$, $=NH$ or $=N-CN$.

The dyes of the formula (1) are known or are obtained in a known manner.

The aqueous dye solutions according to the invention contain at least 0.1 but less than 1 mol of 3-diethylamino-1-propylamine per mol of dye of the formula (1) and a hydroxyalkylamine, for example ethanolamine, diethanolamine, triethanolamine, 2-dimethylaminoethanol, 2-methylaminoethanol, N,N-bis(2-hydroxyethyl)-1,3-diaminopropane, N-(2-hydroxyethyl)ethylenediamine or 2-hydroxypropylamine. Mixtures comprising 2 or more of these hydroxyalkylamines can also be employed.

The dye solutions according to the invention can additionally contain water-soluble organic solubilisers. Suitable examples are: urea, formamide, ε-caprolactam, dimethylformamide, 1,2-diaminopropane, or polyhydric alcohols, for example ethylene glycol, propylene glycol or glycerol.

The amount of organic solubiliser depends, inter alia, on how much 3-diethylamino-1-propylamine and hydroxyalkylamine is present in the dye solutions. If the content of the amines mentioned is about 2 to 4 mol per mol of dye, in general no organic solubiliser or only about 5 to 10% by weight thereof, based on the total weight of the dye solution, is necessary. On the other hand, it is often advantageous for economic reasons to set the content of the amines mentioned at about 1.5 to 2.5 mol per mol of dye and additionally to employ about 10 to 25% by weight of organic solubiliser.

Preferred aqueous dye solutions according to the invention comprise
a) 10 to 30% by weight of a dye of the formula (1),
b) 0.1 to 0.9 mol of 3-diethylamino-1-propylamine per mol of dye of the formula (1),
c) 2–4 mol of hydroxyalkylamine per mol of dye of the formula (1) and
d) 0 to 25% by weight of an organic solubiliser.

Of these, those are particularly preferred which comprise
a) 10 to 30% by weight of a dye of the formula (1),
b) 0.2 to 0.6 mol of 3-diethylamino-1-propylamine per mol of dye of the formula (1),
c) 2.5 to 4 mol of hydroxyalkylamine per mol of dye of the formula (1) and
d) 0 to 25% by weight of an organic solubiliser.

The concentrated aqueous dye solutions according to the invention are in general prepared by stirring the free dye acids with a mixture of water, 3-diethylamino-1-propylamine, hydroxyalkylamine and, if appropriate, an organic solubiliser, until a homogeneous solution is formed. If necessary, the mixture can be warmed, for example to 40° to 80° C., and, if necessary, can be filtered.

The concentrated aqueous dye solutions obtained are distinguished, in particular, by a good storage stability.

The concentrated dye solutions according to the invention are used, if desired after dilution with water, in particular for dyeing and printing paper, including semi-cardboard and cardboard, it being possible to dye these materials, for example, in the mass by coating or by dipping. Otherwise, a liquid formulation of this type can also be employed for a continuous or batchwise dyeing process for textile materials, in particular cellulosic or cellulose-containing textile materials.

The following examples illustrate the invention. Parts are parts by weight.

EXAMPLE 1

1522 parts of the aqueous press cake, comprising 456.5 parts of the dye of the formula

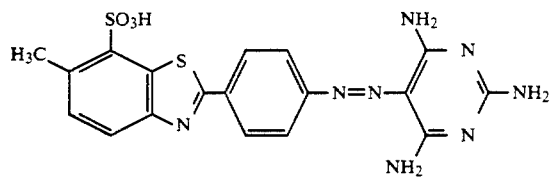

as the free dye acid, are treated with 41.3 parts of 3-diethylamino-1-propylamine, 42 parts of diethanolamine and 246 parts of 2-methylaminoethanol and the mixture is adjusted to a total weight of 4348 parts with water. The suspension obtained is warmed to 50° C. with stirring and stirred at this temperature until the dye has completely gone into solution. The dye solution is then additionally subjected to clarifying filtration.

A commercial liquid dye form is obtained, which contains no residue at all even after one month's storage at 3°–5° C.

EXAMPLE 2

920 parts of the aqueous press cake, comprising 260 parts of the dye of the formula shown in Example 1, are treated with 23.5 parts of 3-diethylamino-1-propylamine and 167 parts of 2-methylaminoethanol and the mixture is adjusted to a total weight of 2600 parts with water. The suspension obtained is warmed to 50° C. with stirring and stirred at this temperature until the dye has completely gone into solution. The dye solution is then additionally subjected to clarifying filtration.

A liquid storage-stable commercial dye form is obtained.

EXAMPLE 3

920 parts of the same aqueous press cake as in Example 2 are treated with 14.8 parts of 3-diethylamino-1-propylamine and 193 parts of dimethylaminoethanol, the mixture is adjusted to a total weight of 2600 parts with water and otherwise additionally processed as explained in Example 2 to give a liquid storage-stable commercial form.

EXAMPLE 4

920 parts of the same aqueous press cake as in Example 2 are treated with 11.7 parts of 3-diethylamino-1-propylamine, 12.6 parts of diethanolamine and 165.5 parts of 2-methylaminoethanol, the mixture is adjusted to a total weight of 2600 parts with water and otherwise additionally processed as explained in Example 2 to give a liquid commercial form.

EXAMPLE 5

920 parts of the same aqueous press cake as in Example 2 are treated with 18.5 parts of 3-diethylamino-1-propylamine, 15 parts of diethanolamine and 107 parts of 2-methylaminoethanol, the mixture is adjusted to a total weight of 2600 parts with water and otherwise additionally processed as explained in Example 2 to give a liquid commercial form.

EXAMPLES 6–10

The procedure described in Example 1 is repeated, except that equivalent amounts of the dyes which are obtained by diazotisation of dehydrothiotoluidine-7-sulfonic acid and coupling with the coupling components shown in the following table are used instead of the dyes employed therein, in this manner affording concentrated solutions of the dyes, which are distinguished by good storage stability.

| Example | Coupling components |
| --- | --- |
| 6 | Barbituric acid |
| 7 | Cyanoiminobarbituric acid |
| 8 | 3-Methyl-5-pyrazolone |
| 9 | 1,3-Dimethylbarbituric acid |
| 10 | 4-Amino-2,6-dihydroxypyrimidine |

EXAMPLE 11

70 parts of chemically bleached sulfite cellulose from conifers and 30 parts of chemically bleached sulfite cellulose from birchwood are ground in 2000 parts of water in a hollander. 0.3 part of the commercial dye form described in Example 1 are added to this pulp. After a mixing time of 20 minutes, paper is manufactured from this pulp. The absorbent paper obtained in this manner is coloured yellow. The waste water is virtually colourless.

What is claimed is:
1. A concentrated aqueous dye solution, comprising
a) 7 to 30% by weight of a dye of the formula

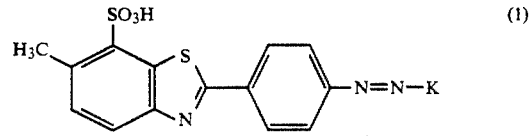
(1)

in which K is a coupling component of the acetoacetanilide, pyridone, pyrazolone or pyrimidine series,
b) at least 0.1 but less than 1 mol of 3-diethylamino-1-propylamine, per mol of dye of the formula (1),
c) a quantity of a hydroxyalkylamine such that altogether 1.5 to 5 mol of the components b) and c) are present per mol of dye, and
d) if desired, other additives.

2. A concentrated aqueous dye solution according to claim 1, comprising 10 to 25% by weight of a dye of the formula (1).

3. A concentrated aqueous dye solution according to claim 1, comprising a dye of the formula (1) in which K is a coupling component of the formula

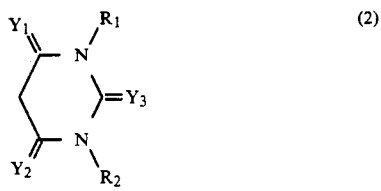

in which $Y_1$ and $Y_2$ independently of one another are $=O$, $=NH$ or $=N-C_1-C_4$alkyl, $Y_3$ is $=O$, $=S$, $=NR$ or $=N-CN$, where R is hydrogen or $C_1-C_4$alkyl, and $R_1$ and $R_2$ independently of one another are each hydrogen, substituted or unsubstituted alkyl or substituted or unsubstituted phenyl.

4. A concentrated aqueous dye solution according to claim 3, in which $R_1$ and $R_2$ independently of one another are each hydrogen or $C_1-C_4$alkyl.

5. A concentrated aqueous dye solution according to claim 3, in which $Y_1$ and $Y_2$ independently of one another are each $=O$ or $=NH$.

6. A concentrated aqueous dye solution according to claim 3, in which $Y_3$ is $=O$, $=S$, $=NH$ or $=N-CN$.

7. A concentrated aqueous dye solution according to claim 4, in which $R_1$ and $R_2$ independently of one another are each hydrogen or $C_1-C_4$alkyl, $Y_1$ and $Y_2$ independently of one another are each $=O$ or $=NH$ and $Y_3$ is $=O$, $=S$, $=NH$ or $=N-CN$.

8. A concentrated aqueous dye solution according to claim 1, which contains 0.1 to 0.9 mol of 3-diethylamino-1-propylamine and 2 to 4 mol of hydroxyalkylamine per mol of dye.

9. A concentrated aqueous dye solution according to claim 1, which contains 0.2 to 0.6 mol of 3-diethylamino-1-propylamine and 2.5 to 4 mol of hydroxyalkylamine.

10. A concentrated aqueous dye solution according to claim 1, which contains diethanolamine, 2-methylaminoethanol or dimethylaminoethanol as the hydroxyalkylamine.

11. A concentrated aqueous dye solution according to claim 1, which contains urea, $\epsilon$-caprolactam or a polyhydric alcohol as the organic solubiliser.

12. A concentrated aqueous dye solution according to claim 1, comprising
 a) 10 to 30% by weight of a dye of the formula (1),
 b) 0.1 to 0.9 mol of 3-diethylamino-1-propylamine per mol of dye of the formula (1),
 c) 2-4 mol of hydroxyalkylamine per mol of dye of the formula (1) and
 d) 0 to 25% by weight of an organic solubiliser.

13. A concentrated dye solution according to claim 12, comprising
 a) 10 to 30% by weight of a dye of the formula (1),
 b) 0.2 to 0.6 mol of 3-diethylamino-1-propylamine per mol of dye of the formula (1),
 c) 2.5 to 4 mol of hydroxyalkylamine per mol of dye of the formula (1) and
 d) 0 to 25% by weight of an organic solubiliser.

14. A process for the preparation of concentrated aqueous dye solutions, which comprises stirring a dye of the formula

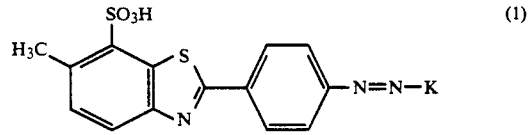

in which K is a coupling component of the acetoacetanilide, pyridone, pyrazolone or pyrimidine series, with a mixture of water, 3-diethylamino-1-propylamine, a hydroxyalkylamine and, if desired, an organic solubiliser until a homogeneous solution is formed.

15. A concentrated aqueous dye solution according to claim 6, in which $Y_3$ is $=NH$.

* * * * *